US012141023B2

(12) United States Patent
Nigudkar et al.

(10) Patent No.: US 12,141,023 B2
(45) Date of Patent: Nov. 12, 2024

(54) SYSTEM FOR MONITORING COMPUTING SERVER PERFORMANCE USING AN ARTIFICIAL INTELLIGENCE-BASED PLUGIN

(71) Applicant: BANK OF AMERICA CORPORATION, Charlotte, NC (US)

(72) Inventors: Avinash Basavant Nigudkar, Mumbai (IN); Piedad Burnside, Hicksville, NY (US); Sanjay Pillay, Round Rock, TX (US); Anton Sumin, New York, NY (US); Silvano Valle, Southold, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 226 days.

(21) Appl. No.: 17/829,495

(22) Filed: Jun. 1, 2022

(65) Prior Publication Data

US 2023/0393919 A1    Dec. 7, 2023

(51) Int. Cl.
*G06F 11/00*    (2006.01)
*G06F 9/50*    (2006.01)
*G06F 11/07*    (2006.01)

(52) U.S. Cl.
CPC ............ *G06F 11/076* (2013.01); *G06F 9/505* (2013.01); *G06F 11/004* (2013.01); *G06F 11/0709* (2013.01)

(58) Field of Classification Search
CPC ............ G06F 11/3433; G06F 11/3476; G06F 11/3409
See application file for complete search history.

(56) References Cited

U.S. PATENT DOCUMENTS

| | | | |
|---|---|---|---|
| 7,506,307 B2 | 3/2009 | Mccollum et al. | |
| 9,547,770 B2 | 1/2017 | Meyer et al. | |
| 10,292,011 B2 | 5/2019 | Johnson | |
| 10,887,640 B2 | 1/2021 | Swaminathan et al. | |
| 11,038,784 B2 | 6/2021 | Nickolov et al. | |
| 11,087,236 B2 | 8/2021 | Nagaraju et al. | |
| 11,165,707 B2 | 11/2021 | Gupta et al. | |
| 11,200,139 B2 * | 12/2021 | Singh ..................... | G06N 20/00 |
| 11,238,377 B2 | 2/2022 | Rowe et al. | |
| 11,336,669 B2 | 5/2022 | Bazalgette et al. | |

(Continued)

*Primary Examiner* — Charles Ehne
(74) *Attorney, Agent, or Firm* — Moore & Van Allen PLLC; Seongun M. Hong

(57) ABSTRACT

A system is provided for monitoring computing server performance using an artificial intelligence-based plugin. In particular, the system may be configured to continuously aggregate computing performance metric data of a computing device in the network, such as a server. The system may analyze the performance metric data using an artificial intelligence-based process to identify the hardware and/or software layers affected by computing workloads. Based on identifying the affected layers, the system may predict the impact of future workloads on the server and, based on the predictions, generate one or more recommendations for remediating server outages or downtime which may be caused by unanticipated volumes of network traffic, system calls, and the like. In this way, the system may provide an efficient way to optimize the use of computing resources within the network environment.

20 Claims, 4 Drawing Sheets

(56) References Cited

U.S. PATENT DOCUMENTS

| | | | |
|---|---|---|---|
| 11,343,268 B2 | | 5/2022 | Apostolopoulos |
| 2011/0282508 A1 | | 11/2011 | Goutard et al. |
| 2015/0370499 A1 | | 12/2015 | Umbehocker |
| 2019/0207966 A1 | | 7/2019 | Vashisht et al. |
| 2019/0332921 A1 | | 10/2019 | Rodriguez |
| 2020/0160458 A1 | | 5/2020 | Bodin et al. |
| 2020/0167258 A1 | | 5/2020 | Chattopadhyay et al. |
| 2020/0302225 A1 | | 9/2020 | Dutta et al. |
| 2020/0364308 A1 | * | 11/2020 | Natanzon ................ G06F 16/22 |
| 2021/0306411 A1 | * | 9/2021 | Takeda ................ H04L 67/1008 |
| 2022/0027431 A1 | | 1/2022 | Zheng et al. |
| 2022/0171648 A1 | | 6/2022 | Rodriguez et al. |

* cited by examiner

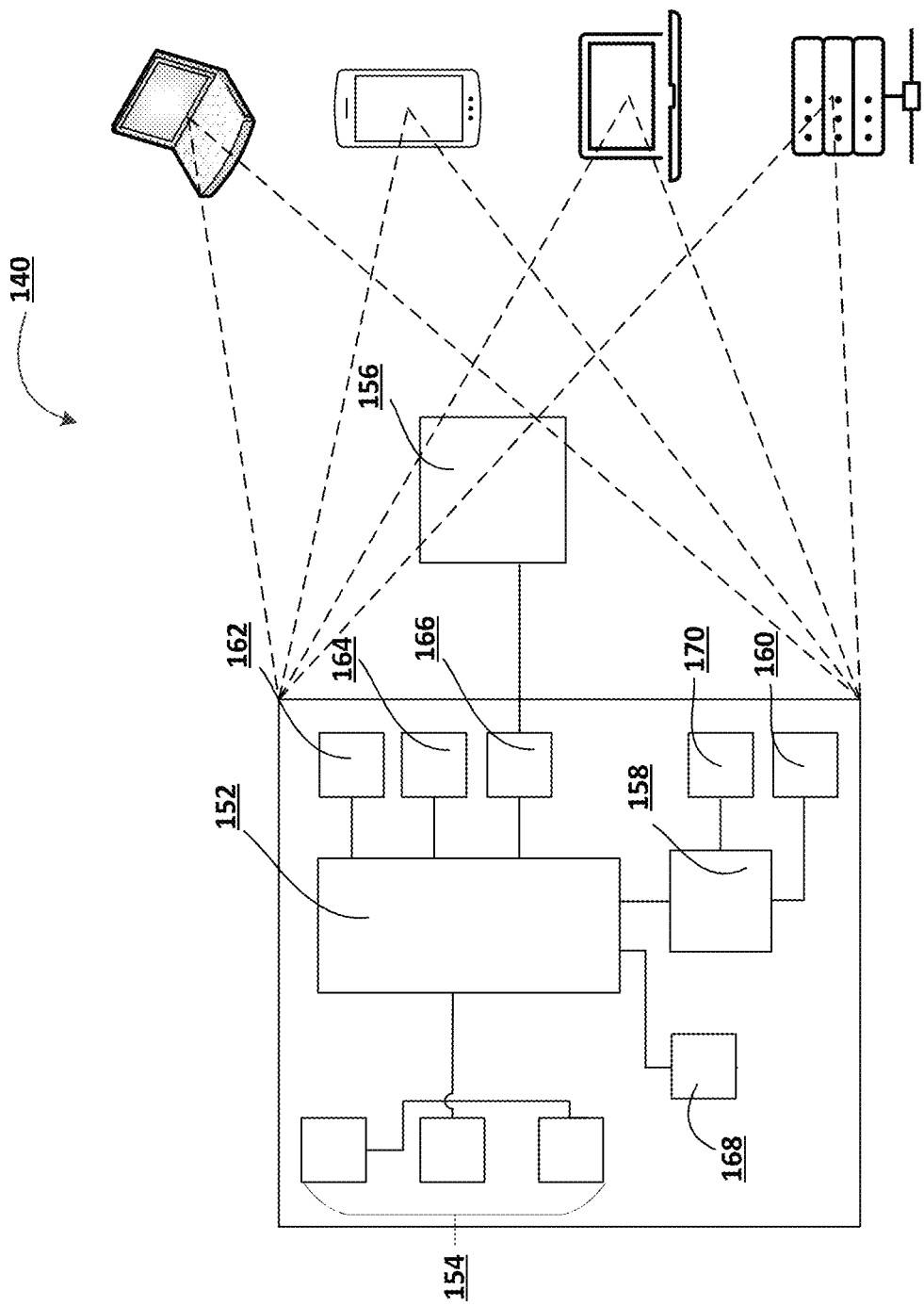

SYSTEM FOR MONITORING COMPUTING SERVER PERFORMANCE USING AN ARTIFICIAL INTELLIGENCE-BASED PLUGIN

FIELD OF THE INVENTION

The present invention embraces a system for monitoring computing server performance using an artificial intelligence-based plugin.

BACKGROUND

There is a need for an efficient way to allocate computing resources.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for monitoring computing server performance using an artificial intelligence-based plugin. In particular, the system may be configured to continuously aggregate computing performance metric data of a computing device in the network, such as a server. The system may analyze the performance metric data using an artificial intelligence-based process to identify the hardware and/or software layers affected by computing workloads. Based on identifying the affected layers, the system may predict the impact of future workloads on the server and, based on the predictions, generate one or more recommendations for remediating server outages or downtime which may be caused by unanticipated volumes of network traffic, system calls, and the like. In this way, the system may provide an efficient way to optimize the use of computing resources within the network environment.

Accordingly, embodiments of the present disclosure provide a system for monitoring computing server performance using an artificial intelligence-based plugin, the system comprising at least one non-transitory storage device; and at least one processor coupled to the at least one non-transitory storage device, wherein the at least one processor is configured to continuously monitor a computing device in a network to aggregate computing performance metric data associated with the computing device; analyze the computing performance metric data using an artificial intelligence plugin, wherein the computing performance metric data comprises historical computing load data associated with the computing device; generate one or more predictions for a future pattern of computing load for the computing device based on one or more identified patterns from the historical computing load data; based on the one or more predictions, generate one or more configuration changes for the computing device in response to the future pattern of computing load; and apply the one or more configuration changes to the computing device.

In some embodiments, the computing performance metric data comprises at least one of processing power, memory usage, and network bandwidth usage.

In some embodiments, the one or more identified patterns comprises a pattern of performance metrics according to computing load.

In some embodiments, the one or more identified patterns comprises a pattern of computing load over time.

In some embodiments, the one or more predictions comprises predicting that the computing load will increase at a future point in time.

In some embodiments, generating the one or more configuration changes comprises identifying one or more hardware or software layers within the computing device that cause a failure of the computing device during heavy computing load; and increasing an allocation of computing resources of the computing device in response to the heavy computing load.

In some embodiments, generating the one or more configuration changes comprises identifying a period of low computing load; and decreasing an allocation of computing resources of the computing device in response to the low computing load.

Embodiments of the present disclosure also provide a computer program product for monitoring computing server performance using an artificial intelligence-based plugin, the computer program product comprising a non-transitory computer-readable medium comprising code causing an apparatus to continuously monitor a computing device in a network to aggregate computing performance metric data associated with the computing device; analyze the computing performance metric data using an artificial intelligence plugin, wherein the computing performance metric data comprises historical computing load data associated with the computing device; generate one or more predictions for a future pattern of computing load for the computing device based on one or more identified patterns from the historical computing load data; based on the one or more predictions, generate one or more configuration changes for the computing device in response to the future pattern of computing load; and apply the one or more configuration changes to the computing device.

In some embodiments, the computing performance metric data comprises at least one of processing power, memory usage, and network bandwidth usage.

In some embodiments, the one or more identified patterns comprises a pattern of performance metrics according to computing load.

In some embodiments, the one or more identified patterns comprises a pattern of computing load over time.

In some embodiments, generating the one or more configuration changes comprises identifying one or more hardware or software layers within the computing device that cause a failure of the computing device during heavy computing load; and increasing an allocation of computing resources of the computing device in response to the heavy computing load.

In some embodiments, generating the one or more configuration changes comprises identifying a period of low computing load; and decreasing an allocation of computing resources of the computing device in response to the low computing load.

Embodiments of the present disclosure also provide a method for monitoring computing server performance using an artificial intelligence-based plugin, the method comprising continuously monitoring a computing device in a network to aggregate computing performance metric data associated with the computing device; analyzing the computing performance metric data using an artificial intelligence plugin, wherein the computing performance metric data comprises historical computing load data associated with the computing device; generating one or more predictions for a future pattern of computing load for the computing device based on one or more identified patterns from the historical computing load data; based on the one or more predictions, generating one or more configuration changes for the computing device in response to the future pattern of computing load; and applying the one or more configuration changes to the computing device.

In some embodiments, the computing performance metric data comprises at least one of processing power, memory usage, and network bandwidth usage.

In some embodiments, the one or more identified patterns comprises a pattern of performance metrics according to computing load.

In some embodiments, the one or more identified patterns comprises a pattern of computing load over time.

In some embodiments, the one or more predictions comprises predicting that the computing load will increase at a future point in time.

In some embodiments, generating the one or more configuration changes comprises identifying one or more hardware or software layers within the computing device that cause a failure of the computing device during heavy computing load; and increasing an allocation of computing resources of the computing device in response to the heavy computing load.

In some embodiments, generating the one or more configuration changes comprises identifying a period of low computing load; and decreasing an allocation of computing resources of the computing device in response to the low computing load.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
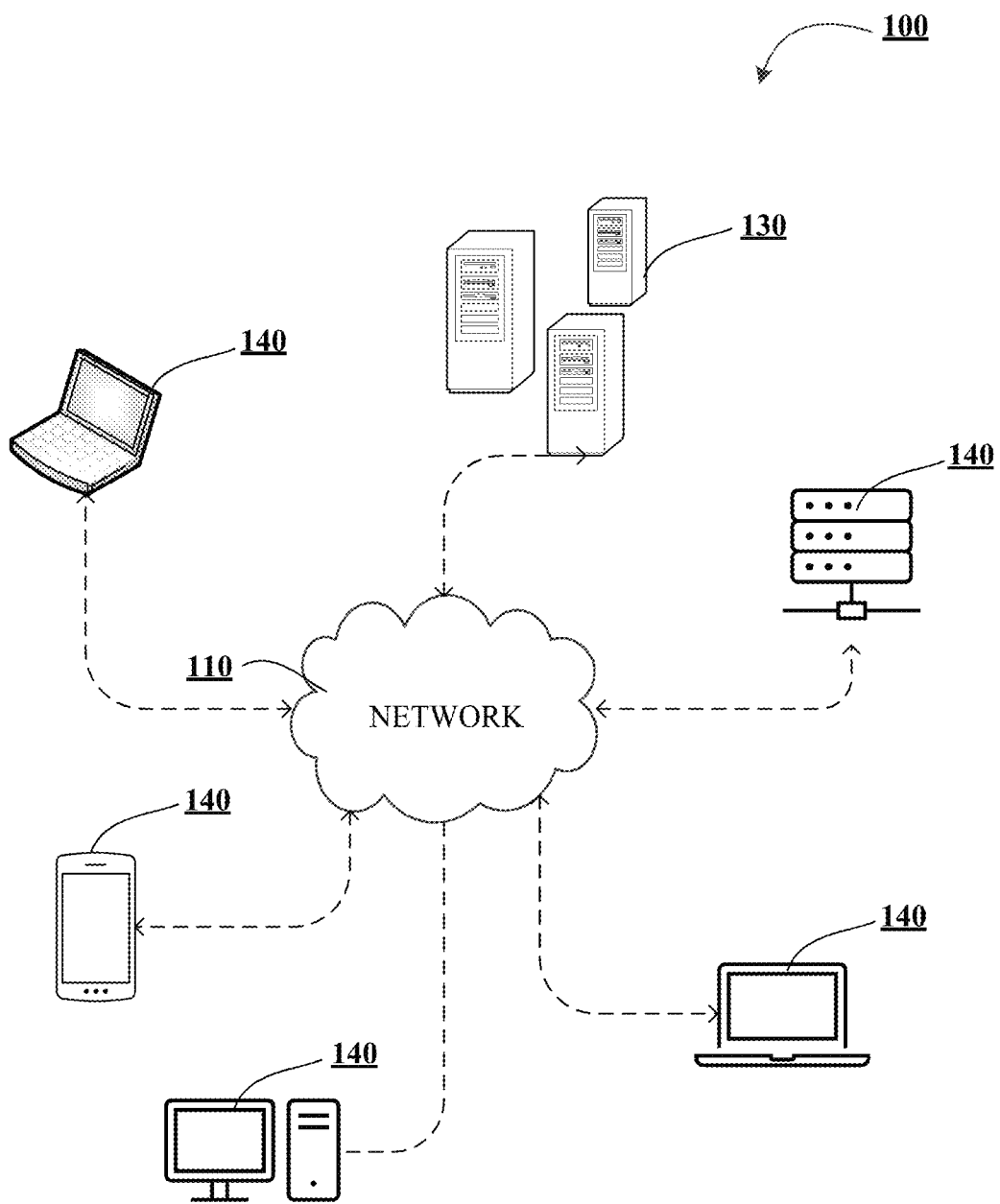
Figure 1B:
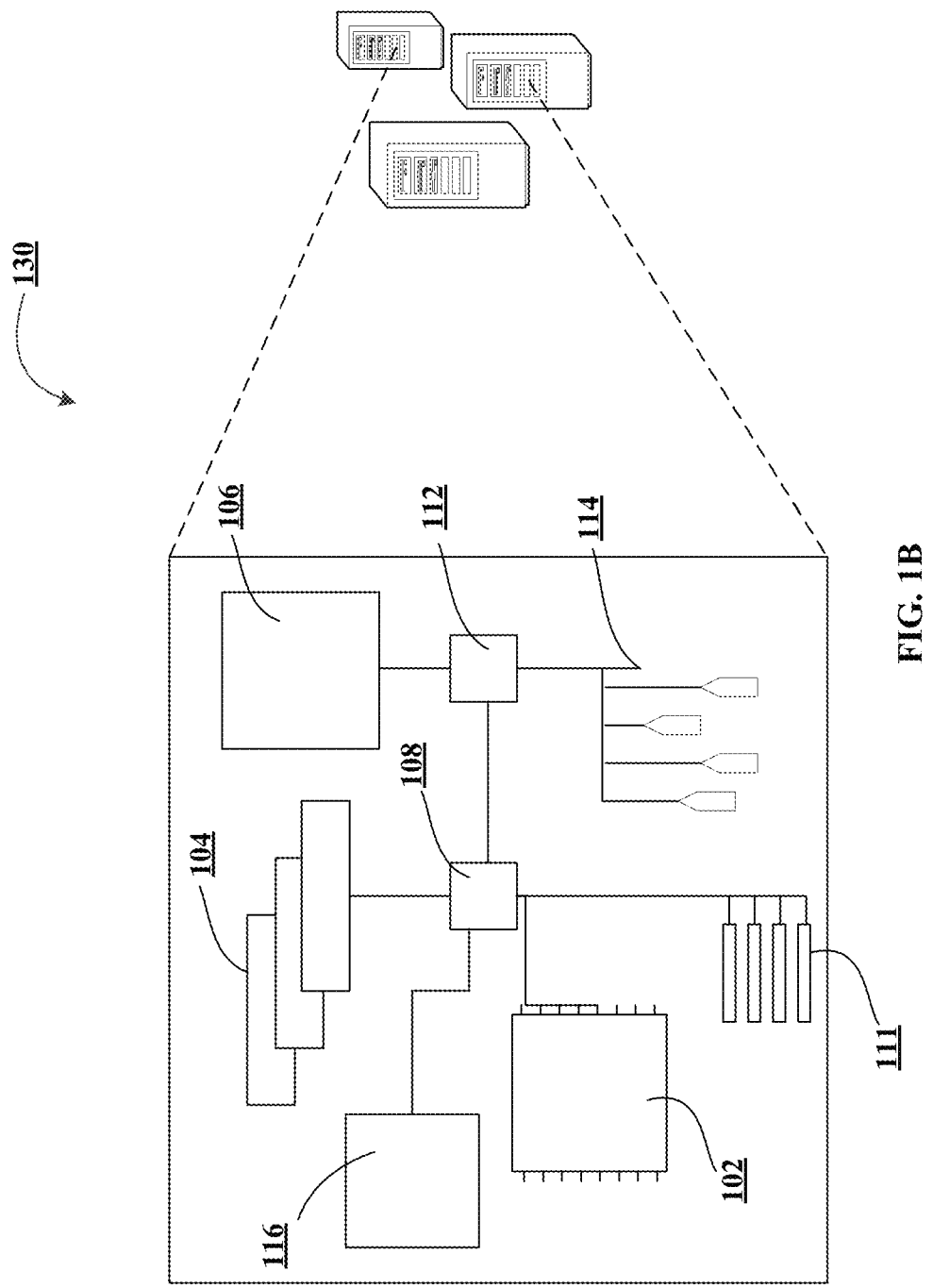
Figure 2:
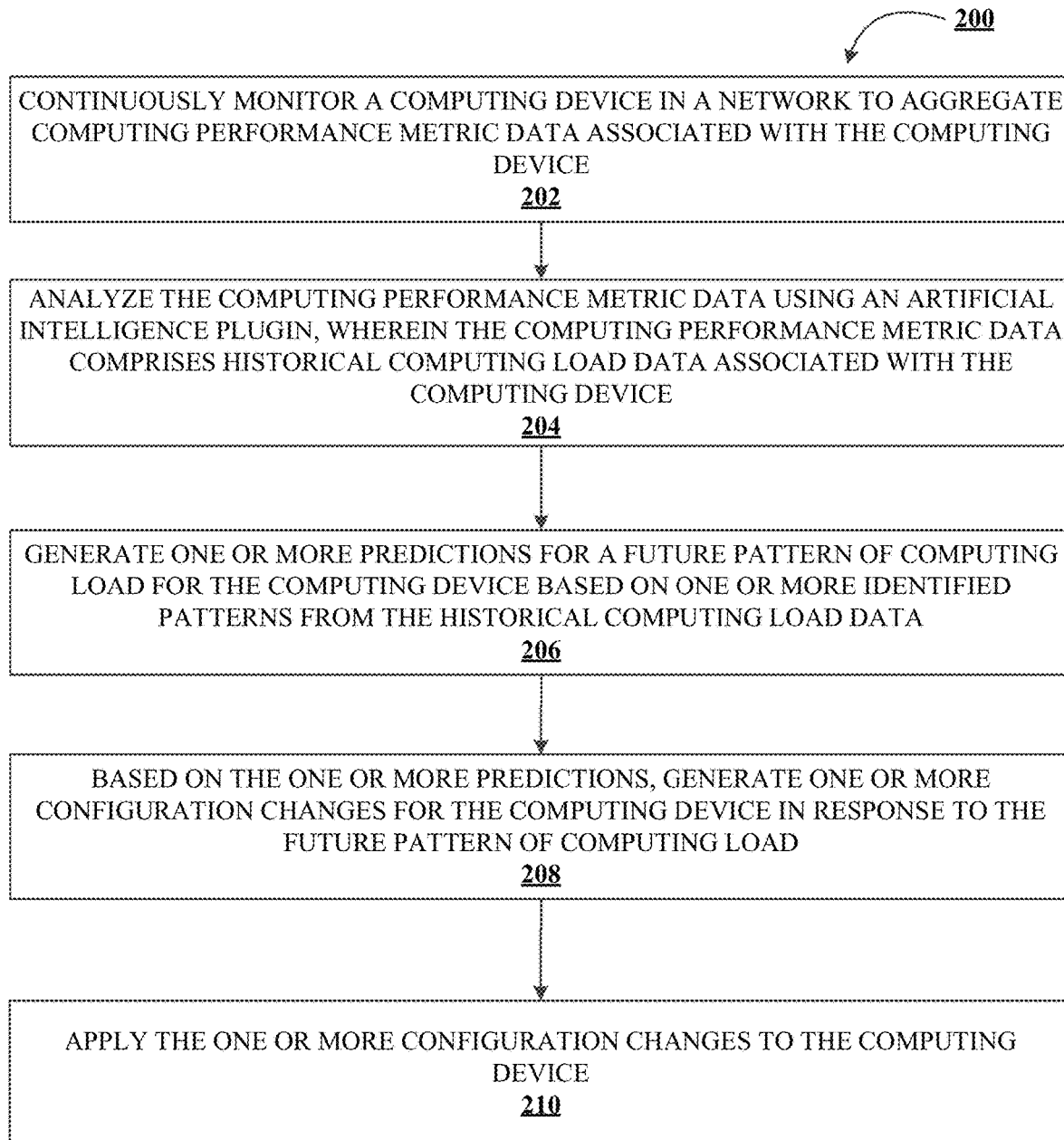

Having thus described embodiments of the invention in general terms, reference will now be made the accompanying drawings, wherein:

FIGS. 1A-1C illustrates technical components of an exemplary distributed computing environment for the system for monitoring computing server performance using an artificial intelligence-based plugin, in accordance with an embodiment of the present disclosure;

FIG. 2 illustrates a process flow for monitoring computing server performance using an artificial intelligence-based plugin, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "computing resource" or "resource" may generally refer to physical and/or virtual components or materials that are used in the operation of a computing device. Accordingly, examples of such resources may include processing power, memory allocation, cache space, storage space, data files, network connections and/or bandwidth, electrical power, input/output functions, and the like.

A network computing device such as a server may use various types of computing resources (e.g., processing power, memory space and/or access, disk storage space, network bandwidth, input/output functions, and the like) to handle and process requests transmitted by endpoint devices within the network. For instance, a web server may be configured to process requests for certain resources stored within the web server (e.g., HTML files, image files, video files, and the like) in response to receiving a request from a computing device (e.g., a desktop computer). That said, servers may encounter scenarios in which the volume of requests (e.g., an unusual spike in the number of requests) causes a strain on the server's computing resources. In such scenarios, there may be delays in processing the requests, server outages, and the like. Accordingly, there is a need for an efficient way to manage computing resources.

To address the foregoing needs among others, the present disclosure provides for a system for monitoring computing server performance using an artificial intelligence-based plugin. The system may continuously collect computing performance metric data, which may include processing power and/or usage, memory usage, disk space usage, networking bandwidth usage, network conditions (e.g., ping, jitter, and/or the like), number of I/O calls, electrical power usage, system responsiveness (e.g., I/O delays, or the like), and the like. The performance metric data may be correlated with the server load experienced by the server across a period of time. The performance data may further include system logs regarding a status of the server, such as error logs, system dumps, crash logs, and the like. Accordingly, the system may track the state of the various computing resources of the server as the server processes various loads of server requests (e.g., high server load, low server load, and the like) along with the state of the server under the various types of server load (e.g., whether the server freezes, crashes, or otherwise provides suboptimal performance during times of high server load).

The collected computing performance metric data may be stored as historical computing performance metric data within a computing performance metric database (which may be referred to herein as "the database"). The system may analyze the historical computing performance metric data using an artificial intelligence plugin, which may compare the requests received by the server against the various performance metrics over time to identify one or more patterns of computing resource usage. In particular, the system may identify the specific layer at which the server has experienced a failure due to the incoming requests (e.g., inadequate memory allocation, processing capacity saturation, network bandwidth saturation, I/O overload, or the like).

Based on the identified patterns, the system may generate one or more predictions for a future pattern of requests or server load. For instance, the system may predict that the server may receive an unusually high number of requests at a specified point in the future. Based on the predictions, the system may generate one or more recommendations to remedy the predicted future pattern of requests. For example, if the system has determined that a server has allocated an inadequate amount of memory to handle a future set of incoming requests, the system may recommend that the server temporarily increases its memory allocation to serve the future incoming requests. On the other hand, if the predicted future pattern indicates that the server will experience unusually low server loads at a point in the future, the system may recommend that the server temporarily decreases the allocated computing resources for handling requests during such a point in the future. In this way, the system may dynamically adjust the usage of computing resources of computing devices in the network such that the computing resources are used in the most efficient way possible at any given point in time.

In some embodiments, the one or more recommendations may be present to a user for review and/or implementation. In such embodiments, the system may generate a notification or alert that may be presented on a graphical user interface displayed on an endpoint device. In this regard, the notification may indicate that one or more hardware and/or software layers of the server may experience an increased server load at a certain point in the future, and that an increase in allocated computing resources is recommended (e.g., allocation of additional network bandwidth). In some embodiments, the notification or alert may be configured to activate an output device of the endpoint device (e.g., an audible alert played through a sound device of the endpoint device) and/or comprise an interactive link that, when activated (e.g., by a mouse click, touch input, or the like), executes one or more remediation processes to address the predicted change in server load. In other embodiments, the system may be configured to dynamically and automatically implement changes in the configuration of the server based on the predictions generated by the AI plugin. For instance, if the system predicts that a certain shift in server load may require additional processing power to avoid processing delays, the system may automatically allocate additional processing power during the predicted timeframes to allow the server to handle the incoming requests.

In some embodiments, the AI plugin may change a configuration of the server to run in one of a number of different modes. For instance, the server may be configured to run in an "idle mode" in which the server uses minimal computing resources (e.g., in times where the server receives few requests), a "self-healing mode" in which the server recovers from a crash, freeze, or error state, a "normal mode" in which the server uses a designated, standard set of computing resources to serve requests, and a "high-performance mode" in which additional computing resources are allocated to the server to meet increased network traffic.

An exemplary embodiment is provided as follows for illustrative purposes. It should be understood that the following examples are not intended to restrict the scope of the disclosure provided herein. In one example, the system may continuously collect performance data metrics regarding a server. Based on the performance data metrics, the system may detect a pattern of heavy server load (e.g., a large number of server requests are sent by endpoint devices in the network) that on Saturdays at 10:00 AM. The system may further determine that the allocated memory of the server during such times of heavy server load is saturated, which in turn leads to system instability. Accordingly, the system may generate a recommendation to increase memory allocation for the server to meet the predicted increase of server load on Saturday at 10:00 AM. The recommendation may be implemented by the system dynamically such that the memory allocation is automatically increased for the designated time period (e.g., switch the server to a high-performance mode). Once the server load has subsided, the system may automatically revert the allocation of computing resources back to standard settings (e.g., switch the server to normal mode). In this way, the system provides an efficient way to manage computing resources of computing devices in the network.

The present disclosure provides a technical solution to the technical problem of computing device instability due to increased processing loads. Specifically, the technical solution presented herein provides a way to dynamically and efficiently manage the computing resources of computing devices using an AI-based plugin, which is an improvement over existing, conventional technologies in the computer networking space, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for the system for monitoring computing server performance using an artificial intelligence-based plugin, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for monitoring computing server performance using an artificial intelligence-based plugin, in accordance with an embodiment of the present disclosure. The process begins at block 202, where the system continuously monitors a computing device in a network to aggregate computing performance metric data associated with the computing device. In particular, the system may track and continuously collect performance metric data over time for the computing devices in the network (e.g., a server). Accordingly, the tracked performance metric data may include metrics such as CPU usage, memory usage, cache or storage usage, network bandwidth usage, number of I/O calls, and the like. Furthermore, the system may track computing load associated with the computing device. For instance, the system may monitor the incoming requests from endpoint devices to the server to determine a computing load experienced by the server due to the incoming requests. By tracking such metrics over time, the system may track how the metrics for a given computing device change in response to varying conditions (e.g., computing loads).

The process continues to block 204, where the system analyzes the computing performance metric data using an artificial intelligence plugin, wherein the computing performance metric data comprises historical computing load data associated with the computing device. The historical computing load data may include the information on server load compared to performance metrics over time, as described above. In this regard, analyzing the computing performance metric data may comprise identifying a pattern of performance metrics for a specified computing load and/or a pattern of computing load for a specified timeframe. The pattern of performance metrics may be identified based on the changes in the performance metrics for certain computing loads. For instance, the system may identify how CPU usage, memory usage, bandwidth usage, and the like increases or decreases based on changes to the computing load (e.g., changes to the number of requests received and/or processed by the server). The pattern of computing load for a specified timeframe may be identified based on changes to computing load dependent on time. For instance, the system may detect certain dates, times, and/or timeframes in which computing load may be unusually high or low (e.g., server requests spike up on weekends).

The process continues to block 206, where the system generates one or more predictions for a future pattern of computing load for the computing device based on one or more identified patterns from the historical computing load data. In particular, the one or more predictions may be based on the pattern or patterns described above (e.g., the pattern of performance metrics for a specified computing load and/or the pattern of computing load over time). For instance, based on the pattern of high server load on weekends, the system may predict that the server load will also be high on the coming weekend. In other instances, the system may predict that server load will be low during certain time frames (e.g., low server load during twilight hours).

The process continues to block 208, where the system, based on the one or more predictions, generates one or more configuration changes for the computing device in response to the future pattern of computing load. In some embodiments, generating the one or more configuration changes may be based on the pattern of performance metrics for a specified computing load and comprise identifying one or more hardware or software layers that cause an error or failure within the server. For instance, the system may determine that inadequate allocation of CPU power causes the server to experience slowdowns in processing server requests during moments of high server load. In other cases, inadequate memory allocation may cause the server to hang or crash, which in turn causes server downtime. In such embodiments, the one or more configuration changes may include increasing CPU power allocation and/or memory allocation to prevent or mitigate the failure of the server in anticipation of high computing loads. In other embodiments, the one or more configuration changes may comprise decreasing computing resource allocations based on periods of lower computing loads.

The process concludes at block 210, where the system applies the one or more configuration changes to the computing device. In some embodiments, applying the one or more configuration changes may comprise the system automatically modifying the configuration of the computing device according to the one or more configuration changes. In such embodiments, automatically modifying the configuration may comprise dynamically changing computing resource use of the computing device based on changes in the computing load. In this way, the system may provide a way to most efficiently use computing resources in response to varying conditions. In other embodiments, applying the one or more configuration changes may be based on user input. In such embodiments, the system may display a graphical interface on an endpoint device, where the graphical interface comprises the one or more configuration changes. The system may be configured to receive the user input through the graphical interface, where the user input is a confirmation of the one or more configuration changes. Once the user input is received, the system may change the configuration of the computing device according to the one or more configuration changes.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for monitoring computing server performance using an artificial intelligence-based plugin, the system comprising:
   at least one non-transitory storage device; and
   at least one processor coupled to the at least one non-transitory storage device, wherein the at least one processor is configured to:
      continuously monitor a computing device in a network to aggregate computing performance metric data associated with the computing device;
      analyze the computing performance metric data using an artificial intelligence plugin, wherein the computing performance metric data comprises historical computing load data associated with the computing device;
      generate one or more predictions for a future pattern of computing load for the computing device based on one or more identified patterns from the historical computing load data, wherein the one or more predictions for the future pattern of computing load for the computing device comprises a prediction that the computing load for the computing device will change during a specified timeframe;
      based on the one or more predictions, generate one or more configuration changes for the computing device in response to the future pattern of computing load; and
      apply the one or more configuration changes to the computing device, wherein applying the one or more configuration changes to the computing device comprises modifying computing resource allocations during the specified timeframe based on the prediction that the computing load for the computing device will change during the specified timeframe.

2. The system of claim 1, wherein the computing performance metric data comprises at least one of processing power, memory usage, and network bandwidth usage.

3. The system of claim 1, wherein the one or more identified patterns comprises a pattern of performance metrics according to computing load.

4. The system of claim 1, wherein the one or more identified patterns comprises a pattern of computing load over time.

5. The system of claim 1, wherein the one or more predictions comprises predicting that the computing load will increase at a future point in time.

6. The system of claim 1, wherein generating the one or more configuration changes comprises:
   identifying one or more hardware or software layers within the computing device that cause a failure of the computing device during heavy computing load; and
   increasing an allocation of computing resources of the computing device in response to the heavy computing load.

7. The system of claim 1, wherein generating the one or more configuration changes comprises:
   identifying a period of low computing load; and
   decreasing an allocation of computing resources of the computing device in response to the low computing load.

8. A computer program product for monitoring computing server performance using an artificial intelligence-based plugin, the computer program product comprising a non-transitory computer-readable medium comprising code causing an apparatus to:

continuously monitor a computing device in a network to aggregate computing performance metric data associated with the computing device;

analyze the computing performance metric data using an artificial intelligence plugin, wherein the computing performance metric data comprises historical computing load data associated with the computing device;

generate one or more predictions for a future pattern of computing load for the computing device based on one or more identified patterns from the historical computing load data, wherein the one or more predictions for the future pattern of computing load for the computing device comprises a prediction that the computing load for the computing device will change during a specified timeframe;

based on the one or more predictions, generate one or more configuration changes for the computing device in response to the future pattern of computing load; and apply the one or more configuration changes to the computing device, wherein applying the one or more configuration changes to the computing device comprises modifying computing resource allocations during the specified timeframe based on the prediction that the computing load for the computing device will change during the specified timeframe.

9. The computer program product of claim 8, wherein the computing performance metric data comprises at least one of processing power, memory usage, and network bandwidth usage.

10. The computer program product of claim 8, wherein the one or more identified patterns comprises a pattern of performance metrics according to computing load.

11. The computer program product of claim 8, wherein the one or more identified patterns comprises a pattern of computing load over time.

12. The computer program product of claim 8, wherein generating the one or more configuration changes comprises:

identifying one or more hardware or software layers within the computing device that cause a failure of the computing device during heavy computing load; and increasing an allocation of computing resources of the computing device in response to the heavy computing load.

13. The computer program product of claim 8, wherein generating the one or more configuration changes comprises:

identifying a period of low computing load; and decreasing an allocation of computing resources of the computing device in response to the low computing load.

14. A method for monitoring computing server performance using an artificial intelligence-based plugin, the method comprising:

continuously monitoring a computing device in a network to aggregate computing performance metric data associated with the computing device;

analyzing the computing performance metric data using an artificial intelligence plugin, wherein the computing performance metric data comprises historical computing load data associated with the computing device;

generating one or more predictions for a future pattern of computing load for the computing device based on one or more identified patterns from the historical computing load data, wherein the one or more predictions for the future pattern of computing load for the computing device comprises a prediction that the computing load for the computing device will change during a specified timeframe;

based on the one or more predictions, generating one or more configuration changes for the computing device in response to the future pattern of computing load; and applying the one or more configuration changes to the computing device, wherein applying the one or more configuration changes to the computing device comprises modifying computing resource allocations during the specified timeframe based on the prediction that the computing load for the computing device will change during the specified timeframe.

15. The method of claim 14, wherein the computing performance metric data comprises at least one of processing power, memory usage, and network bandwidth usage.

16. The method of claim 14, wherein the one or more identified patterns comprises a pattern of performance metrics according to computing load.

17. The method of claim 14, wherein the one or more identified patterns comprises a pattern of computing load over time.

18. The method of claim 14, wherein the one or more predictions comprises predicting that the computing load will increase at a future point in time.

19. The method of claim 14, wherein generating the one or more configuration changes comprises:

identifying one or more hardware or software layers within the computing device that cause a failure of the computing device during heavy computing load; and increasing an allocation of computing resources of the computing device in response to the heavy computing load.

20. The method of claim 14, wherein generating the one or more configuration changes comprises:

identifying a period of low computing load; and decreasing an allocation of computing resources of the computing device in response to the low computing load.

* * * * *